(12) United States Patent
Uhr et al.

(10) Patent No.: US 10,783,260 B2
(45) Date of Patent: Sep. 22, 2020

(54) METHOD FOR PROVIDING SIMPLIFIED ACCOUNT REGISTRATION SERVICE AND USER AUTHENTICATION SERVICE, AND AUTHENTICATION SERVER USING SAME

(71) Applicant: Coinplug, Inc., Gyeonggi-do (KR)

(72) Inventors: Joon Sun Uhr, Gyeonggi-do (KR); Jay Wu Hong, Seoul (KR); Sang Hoon Hyun, Seoul (KR); Ju Min Lee, Gyeonggi-do (KR)

(73) Assignee: Coinplug, Inc., Seongnam-si (KR)

( * ) Notice: Subject to any disclaimer, the term of this patent is extended or adjusted under 35 U.S.C. 154(b) by 0 days.

(21) Appl. No.: 16/546,143

(22) Filed: Aug. 20, 2019

(65) Prior Publication Data
US 2019/0370479 A1    Dec. 5, 2019

Related U.S. Application Data

(63) Continuation of application No. PCT/KR2018/000915, filed on Jan. 19, 2018.

(30) Foreign Application Priority Data

Feb. 21, 2017   (KR) .................. 10-2017-0023149

(51) Int. Cl.
*G06F 21/60* (2013.01)
*G06F 21/31* (2013.01)
(Continued)

(52) U.S. Cl.
CPC ............ *G06F 21/602* (2013.01); *G06F 21/31* (2013.01); *H04L 9/006* (2013.01); *H04L 9/0643* (2013.01);
(Continued)

(58) Field of Classification Search
CPC . H04L 63/0838; H04L 9/0643; H04L 9/0863; H04L 9/0872; H04L 9/32; H04L 9/3213; H04L 9/3228
See application file for complete search history.

(56) References Cited

U.S. PATENT DOCUMENTS

| 8,607,317 B2 * | 12/2013 | Lee ..................... H04L 9/3234 726/6 |
| 2016/0042352 A1 * | 2/2016 | Motoki .............. G06Q 20/3274 235/380 |

(Continued)

FOREIGN PATENT DOCUMENTS

| JP | 2006-031064 A | 2/2006 |
| KR | 2014-0033536 A | 3/2014 |

(Continued)

OTHER PUBLICATIONS

International Search Report issued in PCT application No. PCT/KR2018/000915, dated May 28, 2018, 4 pp.

*Primary Examiner* — Trang T Doan
(74) *Attorney, Agent, or Firm* — Kaplan Breyer Schwarz, LLP

(57) ABSTRACT

According to the present invention, a method for delegating a login via PKI-based authentication for a login request of a user by using a smart contract and a blockchain database is provided. In the method, when information requesting for delegating the login via an authentication app executed by a user terminal is acquired from a service-providing app, a service-providing server transfers authentication request response information to the service-providing app, and when server challenge request information is acquired after an authentication redirection request of the service-providing app is transferred to the authentication app, the service-providing server transfers server challenge request response information to the authentication app, thereby supporting (Continued)

determination of whether certificates of the server and the app are valid, and if the certificates are valid, the service-providing server transfers an access token to the service-providing app, thereby enabling the service-providing app to use the service, and thus processing the login.

25 Claims, 5 Drawing Sheets

(51) Int. Cl.
      *H04L 9/00*          (2006.01)
      *H04L 9/06*          (2006.01)
      *H04L 9/08*          (2006.01)

(52) U.S. Cl.
      CPC .... *H04L 9/0825* (2013.01); *G06F 2221/2117* (2013.01); *H04L 2209/38* (2013.01)

(56) References Cited

U.S. PATENT DOCUMENTS

2016/0219039 A1*   7/2016   Houthooft ............. H04L 9/3228
2016/0335451 A1*  11/2016   Sinor .................. H04L 63/0442

FOREIGN PATENT DOCUMENTS

| KR | 2014-0110540 A | 9/2014 |
|---|---|---|
| KR | 10-1628004 B1 | 6/2016 |
| KR | 10-1691412 B1 | 12/2016 |

* cited by examiner

METHOD FOR PROVIDING SIMPLIFIED ACCOUNT REGISTRATION SERVICE AND USER AUTHENTICATION SERVICE, AND AUTHENTICATION SERVER USING SAME

RELATED APPLICATIONS

This application is a bypass continuation application of International application No. PCT/KR2018/000915 filed Jan. 19, 2018, which in turn claims foreign priority to Korean application No. 10-2017-0023149 filed Feb. 21, 2017, the entire disclosures of which are incorporated herein by reference.

FIELD OF THE DISCLOSURE

The present disclosure relates to a method for providing a service for simplifying an account registration; and more particularly, to the method for performing a simple account registration based on PKI (public key infrastructure) and an authentication server using the same.

BACKGROUND OF THE DISCLOSURE

In general, when a certain institution, i.e., an entity, or a plurality of organizations releases multiple services, for example, when multiple applications (apps) are released, a user has to go through different logins or sign-ups for each of the apps.

As a method for solving such a problem, a standardized authentication method, such as OAuth 2.0, is used in the World Wide Web, mobile and desktop applications as a service for delegation of a login of the user's individual account.

However, such a login delegation cannot always be used, from a service provider's point of view. This is because the login delegation must be based on a trust on user information registered with other institutions. In addition, there may be a case where an individual user needs to have his/her own account for operation of an individual service. For example, in case of a shopping mall, there is a constant need for tracking authenticity of the individual user's delivery address, confirmation of a payment amount, and completion of a payment, but a managing entity of the shopping mall cannot allow an external party to handle such sensitive information via the login delegation.

Therefore, as a method other than the above-mentioned login delegation, a simple and secure account registration method is required.

As such a simple and secure account registration method, the inventors of the present disclosure propose a method that allows a simple and secure account registration for another application, if an account is registered through an authentication of a single application, by using information on the authentication of the single application and by using variable authentication information transmitted along with a PIN number of the user and a push message without requiring personal information that is bothersome to input and may cause problems when leaked.

SUMMARY OF THE DISCLOSURE

It is an object of the present disclosure to provide a method and a server for a service of a simple account registration aforementioned as simple and secure, and to provide a technique that replaces a conventional repetitive account registration method in a simple and secure way.

Operating systems of general mobile devices on recent markets show higher security and lower usability, since sharing information between applications becomes more difficult due to blocking one application from accessing various information including the other application, for example, a sandbox adopted by iOS of Apple, on the basis of security.

It is another object of the present disclosure to prevent lower usability and maintain high security when registering accounts of multiple applications, and to allow an authenticity of an already authenticated account corresponding to one application to be used for a registration of an account of the other application.

In order to accomplish objects above, representative structures of the present disclosure are described as follows.

In accordance with one aspect of the present disclosure, there is provided a method for providing a service for simplifying an account registration, including steps of: (a) on condition that first user identification information including (i) personal information for authentication of a user, (ii) a user ID, corresponding to a 1-st application, of the user, (iii) a first public key created by a secure element included in a user device of the user, and (iv) a first push ID created to be corresponding to the 1-st application has been stored in an authentication server or another device connected with the authentication server in response to a request for registration of an initial account of the user, wherein the first user identification information is to be used for identifying the user of the 1-st application corresponding to the initial account, if the personal information for authentication and account registration requesting information which is information for requesting a simple account registration based on PKI (public key infrastructure) are acquired from the user device via a 2-nd application, different from the 1-st application, executed on the user device, the authentication server determining or supporting another device to determine each validity of the personal information for authentication and the account registration requesting information; and (b) the authentication server, if the account registration requesting information and the personal information for authentication are determined as valid, performing or supporting another device to perform the simple account registration based on the account registration requesting information, wherein the step of (b) includes steps of: (b1) the authentication server transmitting encrypted variable authentication information, which is created by encoding variable authentication information with the first public key, to the 1-st application by using the first push ID corresponding to the personal information for authentication acquired from the user device, to thereby allow the 1-st application to display the variable authentication information, created by decoding the encrypted variable authentication information with a first private key corresponding to the first public key, to the user; (b2) after the variable authentication information is acquired by the 2-nd application, and after a key pair of a second public key and a second private key based on the PKI are created, in a secure element included in the user device, by the 2-nd application, if the variable authentication information, the second public key, and a second push ID created to be corresponding to the 2-nd application are acquired from the 2-nd application, the authentication server determining or supporting another device to determine a validity of the variable authentication information; and (b3) the authentication server, if the variable authentication information is determined as valid, storing or supporting another device to store second user identification information to be used for identifying the user of the 2-nd application.

As one example, at the step of (b2), if a specific PIN number is further acquired from the 2-nd application in addition to the variable authentication information, the second public key, and the second push ID, then the authentication server determines or supports another device to determine each validity of the variable authentication information and the specific PIN number, and wherein, at the step of (b3), if the variable authentication information and the specific PIN number are determined as valid, the authentication server stores or supports another device to store the second user identification information.

As one example, at the step of (b2), if the specific PIN number is identical to a designated PIN number which is set beforehand by the user as corresponding to the 1-st application, then the specific PIN number is determined as valid.

As one example, the second user identification information includes (i) the personal information for authentication of the user, (ii) the user ID, corresponding to the 2-nd application, included in the account registration requesting information, (iii) the second public key, and (iv) the second push ID.

As one example, the personal information for authentication of the user is a phone number corresponding to the user device.

As one example, the variable authentication information is a random nonce or information on an image file.

As one example, the step of (a) includes steps of: (a1) the authentication server retrieving or supporting another device to retrieve the user ID corresponding to the 1-st application by referring to the acquired account registration requesting information and the acquired personal information for authentication; (a2) the authentication server, if the user ID corresponding to the 1-st application is retrieved, and if a function value of the first user identification information is determined as stored by referring to information representing whether the function value of the first user identification information created by applying a particular operation to at least part of the first user identification information corresponding to the user ID of the 1-st application, the user ID of the 1-st application being retrieved from a blockchain database, has been stored, determining or supporting another device to determine that the account registration requesting information and the personal information for authentication are valid; and (a3) the authentication server retrieving or supporting another device to retrieve the first public key from the blockchain database.

As one example, at the step of (b2), the authentication server further stores or supports another device to store an authentication information transaction including one of (i) the second public key and a function value of second user identification information created by applying a particular operation to at least part of the second user identification information and (ii) a processed value of said (i), in a blockchain database.

As one example, the blockchain database is a private blockchain database or a public blockchain database.

As one example, at the step of (b3), if the variable authentication information is determined as valid, the authentication server transmits or supports another device to transmit an account registration message, representing that the simple account registration is completed, to the 2-nd application.

In accordance with another aspect of the present disclosure, there is provided a method for authenticating a user by using a registered account, including steps of: on condition that (1) first user identification information including (i) personal information for authentication of a user, (ii) a user ID, corresponding to a 1-st application, of the user, (iii) a first public key created by a secure element included in a user device of the user, and (iv) a first push ID created to be corresponding to the 1-st application has been stored in an authentication server or another device connected with the authentication server in response to a request for registration of an initial account of the user, wherein the first user identification information is to be used for identifying the user of the 1-st application corresponding to the initial account, (2) (i) the personal information for authentication and (ii) account registration requesting information which is information for requesting a simple account registration based on PKI (public key infrastructure) have been acquired from the user device via a 2-nd application, different from the 1-st application, executed on the user device, (3) if the personal information for authentication and the account registration requesting information have been determined as valid, encrypted first variable authentication information created by encoding first variable authentication information with the first public key has been transmitted to the 1-st application by the authentication server, to thereby allow the 1-st application to display the first variable authentication information, created by decoding the encrypted first variable authentication information with a first private key corresponding to the first public key, to the user, (4) (i) a key pair of a second public key and a second private key based on the PKI has been created, in the secure element included in the user device, by the 2-nd application, (ii) a second push ID created to be corresponding to the 2-nd application, the first variable authentication information, and the second public key have been acquired from the 2-nd application by the authentication server, and (5) if the first variable authentication information has been determined as valid, second user identification information including (i) the personal information for authentication of the user, (ii) the user ID corresponding to the 2-nd application, (iii) the second public key, and (iv) a second push ID created to be corresponding to the second application has been stored in an authentication server or another device connected with the authentication server, wherein the second user identification information is to be used for identifying the user of the second application, and that, as a result, the simple account registration has been completed, (a) the authentication server, if a specific public key and account login requesting information, which is information for requesting an account login based on the PKI via the 2-nd application, are acquired, determining or supporting another device to determine whether the account login requesting information and the specific public key are valid; and (b) the authentication server, if the account login requesting information and the specific public key are determined as valid, performing or supporting another device to perform the account login based on the second user identification information.

As one example, the step of (b) includes steps of: (b1) the authentication server transmitting or supporting another device to transmit second variable authentication information to the 2-nd application, to thereby allow the user device to generate signed second variable authentication information by signing the second variable authentication information using the secure element and to transmit the signed second variable authentication information to the authentication server; (b2) the authentication server verifying or supporting another device to verify a validity of the signed second variable authentication information by using the stored second public key; and (b3) the authentication server, if the signed second variable authentication information is determined as valid, allowing or supporting another device to allow the account login.

As one example, at the step of (a), if a specific PIN number inputted into the user device is further acquired in addition to the account login requesting information and the specific public key, then the authentication server determines or supports another device to determine each validity of the account login requesting information, the specific public key, and the specific PIN number, and wherein, at the step of (b), if the account login requesting information, the specific public key, and the specific PIN number are determined as valid, the authentication server performs or supports another device to perform the account login based on the second user identification information.

As one example, at the step of (a), if the second public key corresponds to the specific public key, then the specific public key is determined as valid.

As one example, the step of (a) includes steps of: (a1) the authentication server retrieving or supporting another device to retrieve the user ID of the 2-nd application by referring to information including the acquired account login requesting information; (a2) the authentication server, if the user ID of the 2-nd application is retrieved, and if a function value of the second user identification information is determined as stored by referring to information representing whether the function value of the second user identification information created by applying a particular operation to at least part of the second user identification information corresponding to the user ID of the 2-nd application, the user ID of the 2-nd application being retrieved from a blockchain database, has been stored, determining or supporting another device to determine that the account login requesting information is valid; (a3) the authentication server retrieving or supporting another device to retrieve the second public key from the blockchain database; and (a4) the authentication server, if the acquired second public key corresponds to the specific public key, determining or supporting another device to determining that the specific public key is valid.

In accordance with still another aspect of the present disclosure, there is provided an authentication server for providing a service for simplifying an account registration, including: a communication part, on condition that first user identification information including (i) personal information for authentication of a user, (ii) a user ID, corresponding to a 1-st application, of the user, (iii) a first public key created by a secure element included in a user device of the user, and (iv) a first push ID created to be corresponding to the 1-st application has been stored in an authentication server or another device connected with the authentication server in response to a request for registration of an initial account of the user, wherein the first user identification information is to be used for identifying the user of the 1-st application corresponding to the initial account, for acquiring the personal information for authentication and account registration requesting information, which is information for requesting a simple account registration based on PKI (public key infrastructure), from the user device via a 2-nd application, different from the 1-st application, executed on the user device; and a processor for performing processes of (I) determining or supporting another device to determine each validity of the personal information for authentication and the account registration requesting information if the personal information for authentication and the account registration requesting information are acquired, and (II) if the account registration requesting information and the personal information for authentication are determined as valid, performing or supporting another device to perform the simple account registration based on the account registration requesting information, wherein the process of (II) includes processes of: (II-1) transmitting encrypted variable authentication information, which is created by encoding variable authentication information with the first public key, to the 1-st application by using the first push ID corresponding to the personal information for authentication acquired from the user device, to thereby allow the 1-st application to display the variable authentication information, created by decoding the encrypted variable authentication information with a first private key corresponding to the first public key, to the user; (II-2) after the variable authentication information is acquired by the 2-nd application, and after a key pair of a second public key and a second private key based on the PKI are created, in a secure element included in the user device, by the 2-nd application, if the variable authentication information, the second public key, and a second push ID created to be corresponding to the 2-nd application are acquired from the 2-nd application, determining or supporting another device to determine a validity of the variable authentication information; and (II-3) if the variable authentication information is determined as valid, storing or supporting another device to store second user identification information to be used for identifying the user of the 2-nd application.

As one example, at the process of (II-2), if a specific PIN number is further acquired from the 2-nd application in addition to the variable authentication information, the second public key, and the second push ID, then the processor determines or supports another device to determine each validity of the variable authentication information and the specific PIN number, and wherein, at the process of (II-3), if the variable authentication information and the specific PIN number are determined as valid, the processor stores or supports another device to store the second user identification information.

As one example, at the process of (II-2), if the specific PIN number is identical to a designated PIN number which is set beforehand by the user as corresponding to the 1-st application, then the specific PIN number is determined as valid.

As one example, the process of (I) includes processes of: (I-1) retrieving or supporting another device to retrieve the user ID corresponding to the 1-st application by referring to the acquired account registration requesting information and the acquired personal information for authentication; (I-2) if the user ID corresponding to the 1-st application is retrieved, and if a function value of the first user identification information is determined as stored by referring to information representing whether the function value of the first user identification information created by applying a particular operation to at least part of the first user identification information corresponding to the user ID of the 1-st application, the user ID of the 1-st application being retrieved from a blockchain database, has been stored, determining or supporting another device to determine that the account registration requesting information and the personal information for authentication are valid; and (I-3) retrieving or supporting another device to retrieve the first public key from the blockchain database.

As one example, at the process of (II-2), the processor further stores or supports another device to store an authentication information transaction including one of (i) the second public key and a function value of second user identification information created by applying a particular operation to at least part of the second user identification information and (ii) a processed value of said (i), in a blockchain database.

As one example, at the process of (II-3), if the variable authentication information is determined as valid, the processor transmits or supports another device to transmit an account registration message, representing that the simple account registration is completed, to the 2-nd application.

In accordance with still yet another aspect of the present disclosure, there is provided an authentication server for authenticating a user by using a registered account, including: a communication part, on condition that (1) first user identification information including (i) personal information for authentication of a user, (ii) a user ID, corresponding to a 1-st application, of the user, (iii) a first public key created by a secure element included in a user device of the user, and (iv) a first push ID created to be corresponding to the 1-st application has been stored in an authentication server or another device connected with the authentication server in response to a request for registration of an initial account of the user, wherein the first user identification information is to be used for identifying the user of the 1-st application corresponding to the initial account, (2) (i) the personal information for authentication and (ii) account registration requesting information which is information for requesting a simple account registration based on PKI (public key infrastructure) have been acquired from the user device via a 2-nd application, different from the 1-st application, executed on the user device, (3) if the personal information for authentication and the account registration requesting information have been determined as valid, encrypted first variable authentication information created by encoding first variable authentication information with the first public key has been transmitted to the 1-st application by the authentication server, to thereby allow the 1-st application to display the first variable authentication information, created by decoding the encrypted first variable authentication information with a first private key corresponding to the first public key, to the user, (4) (i) a key pair of a second public key and a second private key based on the PKI has been created, in the secure element included in the user device, by the 2-nd application, (ii) a second push ID created to be corresponding to the 2-nd application, the first variable authentication information, and the second public key have been acquired from the 2-nd application by the authentication server, and (5) if the first variable authentication information has been determined as valid, second user identification information including (i) the personal information for authentication of the user, (ii) the user ID corresponding to the 2-nd application, (iii) the second public key, and (iv) a second push ID created to be corresponding to the second application has been stored in an authentication server or another device connected with the authentication server, wherein the second user identification information is to be used for identifying the user of the second application, and that, as a result, the simple account registration has been completed, for acquiring a specific public key and account login requesting information, which is information for requesting an account login based on the PKI via the 2-nd application; and a processor for performing processes of (I) determining or supporting another device to determine whether the account login requesting information and the specific public key are valid if the specific public key and the account login requesting information are acquired and (II) if the account login requesting information and the specific public key are determined as valid, performing or supporting another device to perform the account login based on the second user identification information.

As one example, the process of (II) includes processes of: (II-1) transmitting or supporting another device to transmit second variable authentication information to the 2-nd application, to thereby allow the user device to generate signed second variable authentication information by signing the second variable authentication information using the secure element and to transmit the signed second variable authentication information to the authentication server; (II-2) verifying or supporting another device to verify a validity of the signed second variable authentication information by using the stored second public key; and (II-3) if the signed second variable authentication information is determined as valid, allowing or supporting another device to allow the account login.

As one example, at the process of (I), if a specific PIN number inputted into the user device is further acquired in addition to the account login requesting information and the specific public key, then the processor determines or supports another device to determine each validity of the account login requesting information, the specific public key, and the specific PIN number, and wherein, at the process of (II), if the account login requesting information, the specific public key, and the specific PIN number are determined as valid, the processor performs or supports another device to perform the account login based on the second user identification information.

As one example, at the process of (I), if the second public key corresponds to the specific public key, then the specific public key is determined as valid.

As one example, the process of (I) includes processes of: (I-1) retrieving or supporting another device to retrieve the user ID of the 2-nd application by referring to information including the acquired account login requesting information; (I-2) if the user ID of the 2-nd application is retrieved, and if a function value of the second user identification information is determined as stored by referring to information representing whether the function value of the second user identification information created by applying a particular operation to at least part of the second user identification information corresponding to the user ID of the 2-nd application, the user ID of the 2-nd application being retrieved from a blockchain database, has been stored, determining or supporting another device to determine that the account login requesting information is valid; (I-3) retrieving or supporting another device to retrieve the second public key from the blockchain database; and (I-4) if the acquired second public key corresponds to the specific public key, determining or supporting another device to determining that the specific public key is valid.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
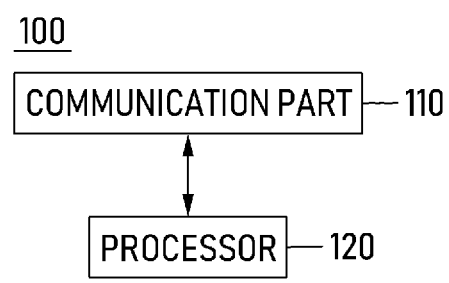
FIG. 1 is a conceptual drawing schematically illustrating an exemplary configuration of an authentication server and a user device performing a simple account registration service and a user authentication service in accordance with a first example embodiment to a third example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the present disclosure. Also, throughout the present specification, a particular function used in the present disclosure may be a hashing function, a function value may be a hash value generated by using the hashing function, a particular tree may be a Merkle tree or a Patricia tree, and a representative function value of the particular tree may be a root value of the Merkle tree, but the scope of the present disclosure is not limited thereto.

Throughout the present specification, a "database" may be systematic data, i.e., integral sets of managed information and its management system, and may include at least part of a general relational database, MongoDB, and a blockchain database, but the scope of the present disclosure is not limited thereto. The present specification describes a blockchain database of a virtual currency for convenience of explanation, but those skilled in the art understand that the method in accordance with the present disclosure may be implemented to cover various modifications and equivalent arrangements with other types of databases.

In this specification, a "public blockchain database" indicates every computing device, on a system that resides over a public blockchain which is a blockchain used by public, utilized as a database.

Further, in this specification, a "private blockchain database" may indicate a database using an independently configured private blockchain which is managed directly by the authentication server of the present disclosure, not the public blockchain.

The virtual currency may be digital currency distributed by transactions based on digital wallets of blockchain technology, such as Bitcoin, Litecoin, Darkcoin, Namecoin, Dogecoin, Ripple, etc.

Besides, in the detailed description and claims of the present disclosure, a term "include" and its variations are not intended to exclude other technical features, additions, components or steps. Other objects, benefits and features of the present disclosure will be revealed to those skilled in the art, partially from the specification and partially from the implementation of the present disclosure. The following examples and drawings will be provided as examples but they are not intended to limit the present disclosure. The headings and abstract of the present disclosure provided herein are for convenience only and do not limit or interpret the scope or meaning of the embodiments.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views. Also, throughout the present specification, a term "specific" is added to terms or concepts related to one or more major subjects which are active in taking actions, and a term "associated" is added to terms or concepts related to other nodes in a same Merkle tree which includes a specific node and/or to values included in said other nodes. However, the term "specific" and the term "associated" may be omitted, as the case may be.

A first example embodiment of the present disclosure provides a simple account registration service and a user authentication service in accordance with the present disclosure, without a blockchain database except for an authentication server.

A second example embodiment in accordance with the present disclosure shows a configuration of recording information on an account in the blockchain database using an unspent transaction output, i.e., UTXO, and thus performing the simple account registration service and the user authentication service.

A third example embodiment in accordance with the present disclosure shows a configuration of anchoring that seeks two-fold integrity of recorded information, by recording transactions in a first blockchain database as the information on the account using the UTXO, and then recording a representative function value, created from the transactions recorded in the first blockchain database, in the second blockchain database.

For reference, in accordance with the present disclosure, the first blockchain database may be a blockchain database where data is stored directly, and the second blockchain database may be a blockchain database where the data is stored indirectly via the first blockchain database for ensuring integrity of the data.

As used in this specification and the appended claims, the singular forms "a," "an," and "the" include plural referents unless the content and context clearly dictates otherwise. These embodiments will be described in sufficient detail by referring to attached drawings regarding the embodiments of the present disclosure to allow those skilled in the art to practice the disclosure.

FIG. 1 is a conceptual drawing schematically illustrating an exemplary configuration of the authentication server and a user device performing the simple account registration service and the user authentication service in accordance with the present disclosure.

By referring to FIG. 1, the authentication server and the user device may typically perform the method in accordance with the present disclosure by using combinations of at least one computing device 100 and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software, and the computing device 100 as such may include a communication part 110 and a processor 120, and may communicate with each other directly or indirectly.

The communication part 110 of such computing devices may transmit requests and receive responses with other linked devices. As one example, such requests and responses may be carried out by the same TCP session, but they are not limited to these. For example, they could be transmitted and received as UDP datagrams.

Also, the processor 120 of such devices may include hardware configuration of MPU (Micro Processing Unit) or CPU (Central Processing Unit), cache memory, data bus, etc. Additionally, any OS and software configuration of applications that achieve specific purposes may be further included.

The user device to be used for implementing the method in accordance with the present disclosure may be a smart phone in general, but the scope of the present disclosure is not limited thereto, and the user device may include any devices or terminals capable of providing the simple account registration service and the user authentication service provided by the authentication server.

First Example Embodiment

The delegation method for the login in accordance with the first example embodiment of the present disclosure is described as follows.

Figure 2:
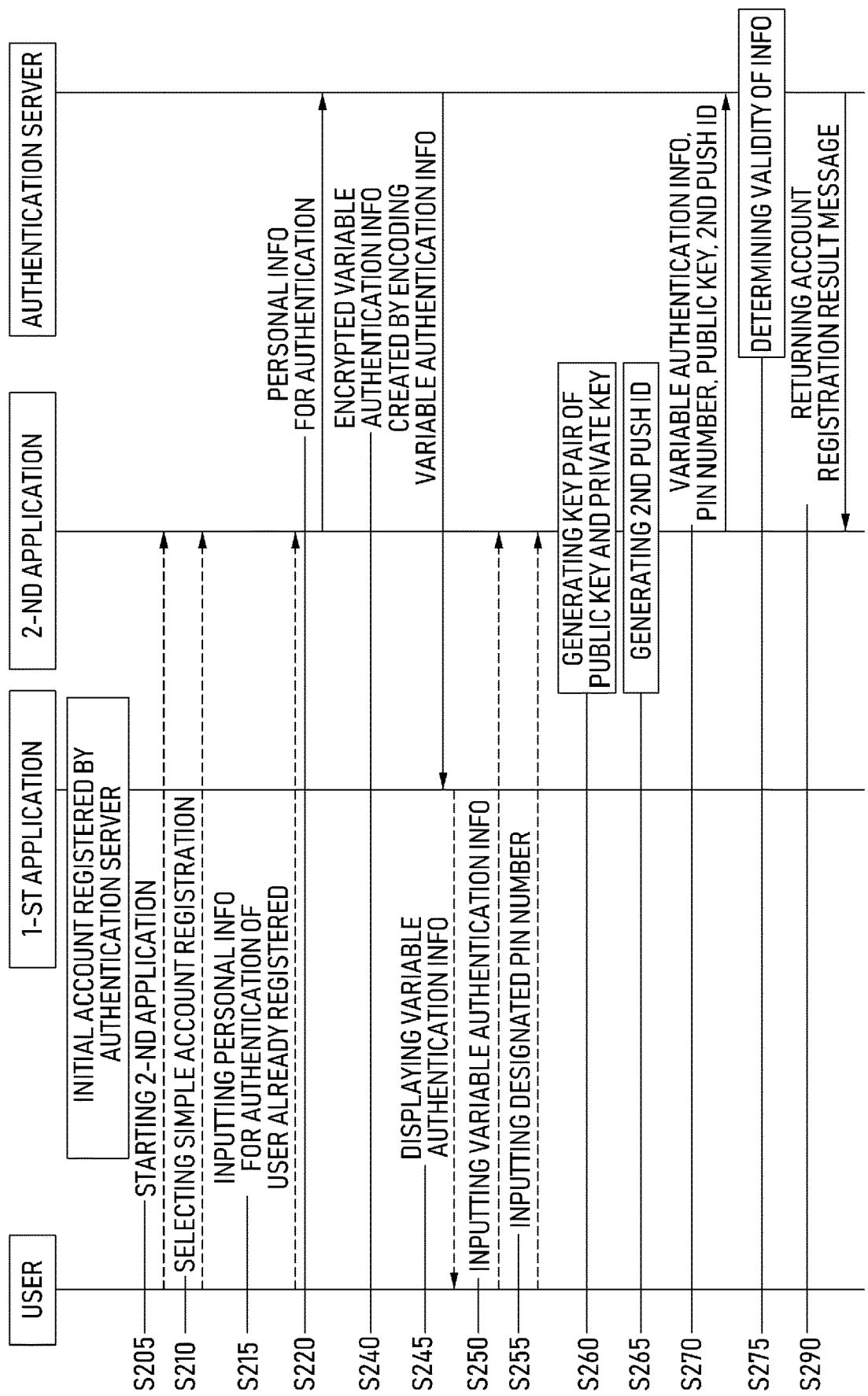
FIG. 2 is a sequence diagram exemplarily illustrating a method for providing the simple account registration service in accordance with the first example embodiment of the present disclosure.

FIG. 2 is a sequence diagram exemplarily illustrating a method for providing the simple account registration service, referred to as a "simple account registration method" hereinafter, in accordance with the present disclosure.

By referring to FIG. 2, the simple account registration method in accordance with the first example embodiment of the present disclosure may be performed on condition that first user identification information including (i) personal information for authentication of a user, (ii) a user ID, corresponding to a 1-st application, of the user, (iii) a first public key created by a secure element included in the user device of the user, and (iv) a first push ID created to be corresponding to the 1-st application has been stored in the authentication server or another device connected with the authentication server in response to a request for registration of an initial account of the user, wherein the first user identification information is to be used for identifying the user of the 1-st application corresponding to the initial account. Herein, the personal information for authentication may be information to be used for distinguishing the user from other users, and, as one example, may be a phone number corresponding to the user device, but the scope of the present disclosure is not limited thereto.

Before describing the simple account registration method of the first example embodiment, a process of the registration of the initial account of the user is described briefly as below.

First, at a time of the registration of the initial account, initial account registration requesting information, which is information for requesting the registration of the initial account based on PKI (public key infrastructure) via the 1-st application executed on the user device, may be determined as valid by the authentication server or another device connected with the authentication server which acquired the initial account registration requesting information, and the registration of the initial account may be performed based on the initial account registration requesting information. In general, each authenticity of the initial account registration requesting information and the personal information submitted by the user for the registration of the initial account may be determined through non face-to-face authentication such as a mobile phone authentication or a phone confirmation, and herein, the initial account registration requesting information may also be determined as valid by a managing party of an application service or by a managing party of the authentication server that determined the initial account registration as normally requested by the normal user.

Especially, as an accompanying process of the registration of the initial account, at the time of the registration of the initial account, the authentication server may allow the user device to generate a key pair of a public key and a private key based on the PKI, within the secure element included in the user device, to thereby acquire the generated public key from the user device and acquire the first push ID created to be corresponding to the 1-st application. Herein, a designated PIN number for the 1-st application may also be acquired. The information acquired as such may be stored in the authentication server or another device, and as a result, the second user identification information including (i) the personal information for authentication, (ii) the user ID, corresponding to the 1-st application, of the user, (iii) the first public key, and (iv) the first push ID may be stored, and thus the registration of the initial account may be completed.

Herein, to briefly describe an encryption based on the PKI used in the present disclosure, in general, information to be transmitted by a sender may be encoded by using a public key of a receiver of the information transmitted and received among entities which process the above methods in accordance with the present disclosure. The receiver may acquire the information to be transmitted, by decoding the encoded information using a private key of the receiver, and those skilled in the art understand that the encryption and the decryption as such are applied to which step of the method in accordance with the present disclosure. However, the information to be transmitted is not always encoded by using the public key of the receiver of the information. For example, a well-known symmetric-key algorithm may be used.

By referring to FIG. 2 again, the simple account registration method in accordance with the first example embodiment of the present disclosure may include steps as follows: on condition that the registration of the initial account has been completed as above, via the 2-nd application at a step of S205, different from the 1-st application, executed on the user device, if the account registration requesting information which is information for requesting the simple account registration based on the PKI at a step of S210 and the personal information for authentication at a step of S215 are acquired from the user device at a step of S220, the authentication server determines or supports another device to determine each validity of the personal information for authentication and the account registration requesting information at steps of S225 to S235 (not illustrated in FIG. 2, referring to FIG. 3).

Herein, determination of each validity of the personal information for authentication and the account registration requesting information may be performed by determining, for example, whether the account registration requesting information conforms to a preset format, whether the personal information for authentication, for example, information corresponding to the phone number of the user device, is stored in the authentication server, and whether the phone number of the user device is identical to a phone number stored in the authentication server. As an example, the account registration requesting information may also be information representing that the user, corresponding to the personal information for authentication, requests the registration of the account of the 2-nd application, and thus a step of determining whether the account registration requesting information conforms to the preset format may be included in the determination.

Next, by referring to FIG. 2, the simple account registration method in accordance with the first example embodiment may further include steps as follows: if the account registration requesting information and the personal information for authentication are determined as valid at steps of S240 to S275, the authentication server performs or supports another device to perform the simple account registration based on the account registration requesting information at a step of S280 (not illustrated in FIG. 2, referring to FIG. 3).

Specifically, the above steps may include steps as follows: the authentication server transmits encrypted variable authentication information, which is created by encoding variable authentication information, e.g., a random nonce, with the first public key, to the 1-st application by using the first push ID corresponding to the personal information for authentication acquired from the user device at a step of S240, to thereby allow the 1-st application to display the variable authentication information, created by decoding the encrypted variable authentication information with a first private key corresponding to the first public key, to the user at a step of S245, the variable authentication information is acquired by the 2-nd application at a step of S250, a key pair of a second public key and a second private key based on the PKI is created, within the secure element included in the user device, by the 2-nd application at a step of S260, if a second push ID, created at a step of S265 to be corresponding to the 2-nd application, the variable authentication information, and the second public key are acquired from the 2-nd application at a step of S270, the authentication server determines or supports another device to determine a validity of the variable authentication information at a step of S275, and if the variable authentication information is determined as valid, the authentication server stores or supports another device to store second user identification information to be used for identifying the user of the 2-nd application at a step of S280 (not illustrated in FIG. 2, referring to FIG. 3).

Herein, the variable authentication information may be used for determining whether the user of the 2-nd application is authorized to use the 1-st application, for example, whether the user is actually using the 1-st application, and may be a disposable number. For example, the variable authentication value may be a random nonce, i.e., a random value, generated by using an arbitrary seed. The variable authentication information may be a random nonce, but the scope of the present disclosure is not limited thereto, for example, the variable authentication information may be information on an image file.

A process of the authentication using the variable authentication information in case the variable authentication information is the information on the image file is briefly described as below. For example, the 2-nd application may display images of a sparrow, an elephant, a fox, a tiger, a rooster, and a pig for the authentication by the variable authentication information, and if the 1-st application is displaying the image of the pig in response to the variable authentication information, the user may select the image of the pig among the images displayed by the 2-nd application in response to the image of the pig displayed by the 1-st application, and as a result, the authentication using the variable authentication information may be performed. Herein, if the user selects an image other than the image of the pig, the authentication by the variable authentication information fails.

Further details on various methods to create the variable authentication value will not be explained, since it is not necessary for understanding the present disclosure, but these may be known or easily understood by those skilled in the art.

Also, similar to the first user identification information, the second user identification information may include (i) the personal information for authentication of the user, (ii) the user ID, corresponding to the 2-nd application, included in the account registration requesting information, (iii) the second public key, and (iv) the second push ID.

Meanwhile, depending on implementation of the steps above, the PIN number may further be used, and the PIN number may be information which the user inputs into the user device to prove an identity of the user, and for example, may be a password including alphanumerics and special characters, but the scope of the present disclosure is not limited thereto, and those skilled in the art understand that the PIN number may be replaced with information used in biometrics technology such as FIDO.

In case of the implementation where the PIN number is further used, at the steps of S250 to S275, if a specific PIN number is further acquired from the 2-nd application in addition to the variable authentication information, the second public key, and the second push ID, then the authentication server may determine or support another device to determine each validity of the variable authentication information and the specific PIN number, and at the step of S280, and if all of the variable authentication information and the specific PIN number are determined as valid, the authentication server may store or support another device to store the second user identification information. When determining the validity of the specific PIN number, if the specific PIN number corresponds to the designated PIN number which is set beforehand by the user as corresponding to the 1-st application, then the specific PIN number may be determined as valid.

By further referring to FIG. 2, the simple account registration method in accordance with the first example embodiment may further include a step as follows: if the variable authentication information is determined as valid, the authentication server transmits or supports another device to transmit an account registration message, representing that the simple account registration is completed, to the 2-nd application as an account registration result message at a step of S290, but this step is not a requirement. If none of the account registration requesting information, the personal information for authentication, and the variable authentication information is determined as valid, the authentication server may transmit or support another device to transmit a failed-account registration message, representing that the simple account registration is not completed, to the 2-nd application as the account registration result message.

Next, a method, referred to as a "user authentication method" hereinafter, for authenticating the user by using the registered account via the simple account registration method aforementioned is described. Below, the technological characteristics identical to those of the simple account registration method in accordance with the aforementioned first example embodiment will be omitted, and only specific details will be disclosed.

The user authentication method in accordance with the first example embodiment may be performed on condition that the simple account registration and the registration of the initial account of the user have been completed by the simple account registration method aforementioned, and may include a step as follows: if a specific public key and account login requesting information, which is information for requesting an account login based on the PKI via the 2-nd application, are acquired, the authentication server determines or supports another device to determine whether the account login requesting information and the specific public key are valid at a step of S310 (not illustrated).

For example, at the step of S310, if the second public key corresponds to, e.g., is identical to, the specific public key, then the specific public key may be determined as valid.

Lastly, the user authentication method in accordance with the first example embodiment may further include a step as follows: if the account login requesting information and the specific public key are determined as valid, the authentication server performs or supports another device to perform the account login based on the second user identification information at a step of S320 (not illustrated).

For example, the step of S320 may include steps as follows: the authentication server transmits or supports another device to transmit second variable authentication information to the 2-nd application, to thereby allow the user device to generate signed second variable authentication information by signing the second variable authentication information using the secure element and to transmit the signed second variable authentication information to the authentication server at a step of S322 (not illustrated), the authentication server verifies or supports another device to verify a validity of the signed second variable authentication information by using the stored second public key at a step of S324 (not illustrated), and if the signed second variable authentication information is determined as valid, the authentication server allows or supports another device to allow the account login at a step of S326 (not illustrated).

Herein, a process of verifying the validity of the signed second variable authentication information is briefly described as follows. First, a function value A may be acquired from the signed second variable authentication information by using the second public key, and the validity of a signature may be verified by comparing the function value A and a result B of applying a particular function to the second variable authentication information. In the comparison as such, it is known to those skilled in the art that the signature is valid if the function value A and the result B of using the particular function are identical and that the signature is invalid if they are not, therefore those skilled in the art may understand how to verify the signature, i.e., an electronic signature.

Herein, particular functions used for the particular operation may include an MD4 function, an MD5 function, an SHA-0 function, an SHA-1 function, an SHA-224 function, an SHA-256 function, an SHA-384 function, an SHA-512 function and a HAS-160 function, but the scope of the present disclosure is not limited thereto. For example, a Triple SHA256 function may also be included.

Meanwhile, in case of the implementation where the PIN number is further used, at the step of S310, if the specific PIN number inputted into the user device is further acquired in addition to the account login requesting information and the specific public key, then the authentication server may determine or support another device to determine each validity of the account login requesting information, the specific public key, and the specific PIN number. And, at the step of S320, if all of the account login requesting information, the specific public key, and the specific PIN number are determined as valid, the authentication server may perform or support another device to perform the account login based on the second user identification information. A process of determining the validity of the specific PIN number is similar to those aforementioned, and thus omitted.

Second Example Embodiment

Next, the second example embodiment of the method in accordance with the present disclosure is explained. Below, the technological characteristics identical to those of the aforementioned first example embodiment will be omitted, and only specific details will be disclosed.

Figure 3:
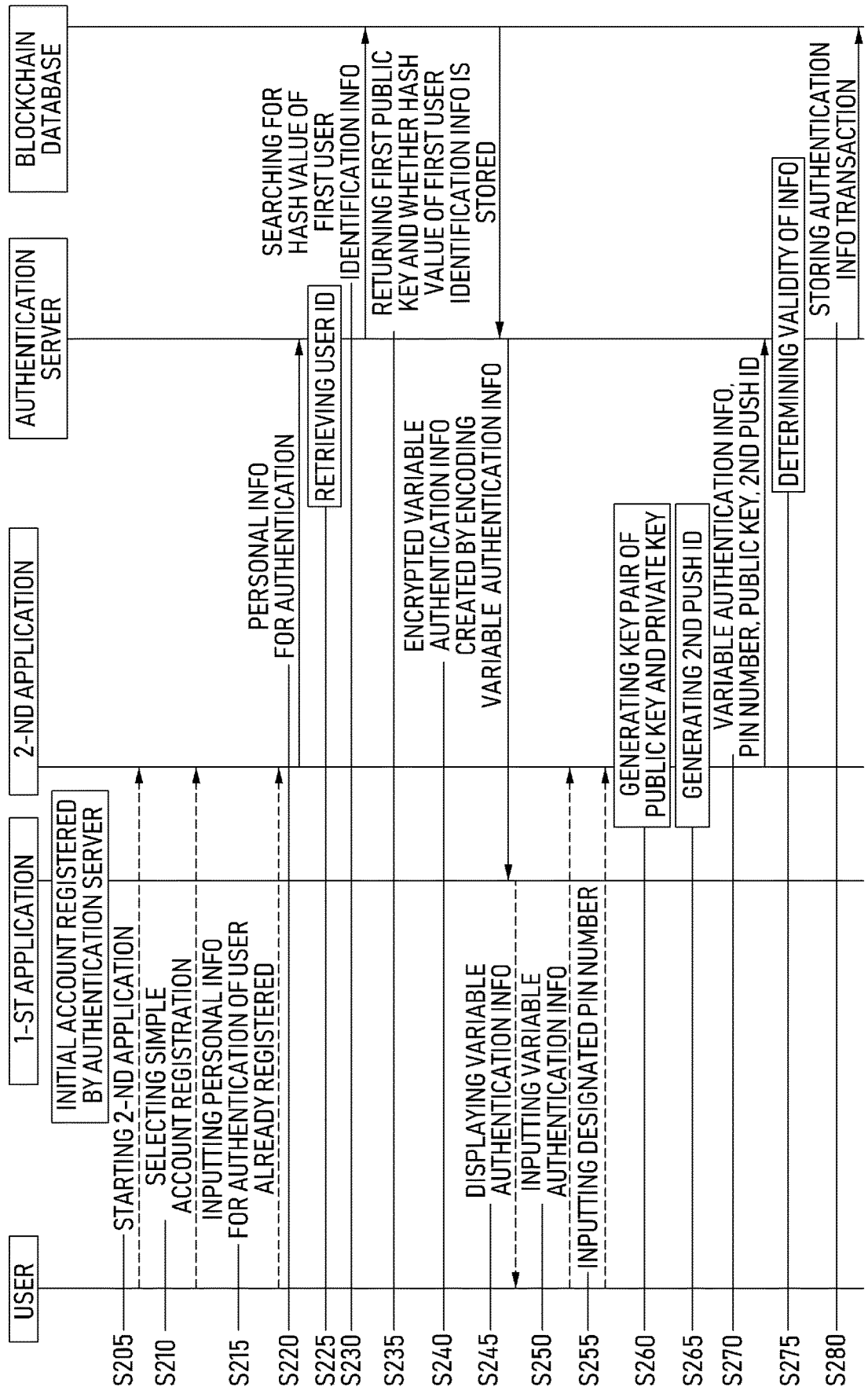
FIG. 3 is a sequence diagram exemplarily illustrating the method for providing the simple account registration service in accordance with the second example embodiment and the third example embodiment of the present disclosure.

FIG. 3 is a sequence diagram exemplarily illustrating the simple account registration method in accordance with the second example embodiment of the present disclosure. Below, the technological characteristics identical to those of the simple account registration method in accordance with the aforementioned first example embodiment will be omitted, and only specific details will be disclosed.

The simple account registration method in accordance with the second example embodiment may be performed on condition that a first authentication information transaction including one of (i) the first public key and a function value of the first user identification information created by applying the particular operation to at least part of the first user identification information and (ii) a processed value of said (i) has been stored in the blockchain database. Herein, the blockchain database may be a private blockchain database or a public blockchain database.

Then, in the second example embodiment, the steps of S225 to S235 aforementioned in the first example embodiment may include the steps as follows: the authentication server retrieves or supports another device to retrieve the user ID corresponding to the 1-st application by referring to the acquired account registration requesting information and the acquired personal information for authentication at the step of S225 in FIG. 3, if the user ID corresponding to the 1-st application is retrieved, and if a function value of the first user identification information is determined as stored by referring to information representing whether the function value of the first user identification information created by applying the particular operation to at least part of the first user identification information corresponding to the user ID of the 1-st application, the user ID of the 1-st application being retrieved from the blockchain database, has been stored, the authentication server determines or supports another device to determine that the account registration requesting information and the personal information for authentication are valid at the step of S230, and the authentication server retrieves or supports another device to retrieve the first public key from the blockchain database at the step of S235.

Herein, the function value of the user identification information may result from applying the particular operation to at least part of the user identification information which may further include at least one of (i) a name of the user, (ii) a birth date of the user, (iii) contact information on the user, and (iv) an e-mail address of the user. However, the scope of the present disclosure is not limited thereto.

Next, in the second example embodiment, the step of S280 aforementioned in the first example embodiment may include a step as follows: the authentication server further stores or supports another device to store a second authentication information transaction including one of (i) the second public key and a function value of second user identification information created by applying the particular operation to at least part of the second user identification information and (ii) a processed value of said (i), in the blockchain database. The second authentication information transaction of the second public key and the function value of the second user identification information is similar to the first authentication information transaction, and thus the description is omitted.

As a result of storing the authentication information transactions in the blockchain database, a managing party using the authentication server or a third party authorized to access the blockchain database may verify an authenticity of the registration of the account and may also manage statistics of the registration of the account.

Next, the user authentication method in accordance with the second example embodiment which uses the registered account via the simple account registration method of the second example embodiment aforementioned is described. Below, the technological characteristics identical to those of the user authentication method in accordance with the aforementioned first example embodiment will be omitted, and only specific details will be disclosed.

Similar to the simple account registration method in the second example embodiment, the user authentication method in accordance with second example embodiment may be performed on condition that the second authentication information transaction including one of (i) the second public key and the function value of the second user identification information created by applying the particular operation to at least part of the second user identification information according to the simple account registration method of the second example embodiment and (ii) a processed value of said (i) has been stored in the blockchain database.

Then, in the second example embodiment, the step of S310 aforementioned in the first example embodiment may include steps as follows: the authentication server retrieves or supports another device to retrieve the user ID corresponding to the 2-nd application by referring to information including the acquired account login requesting information at a step of S312 (not illustrated), if the user ID corresponding to the 2-nd application is retrieved, and if the function value of the second user identification information is determined as stored by referring to information representing whether the function value of the second user identification information created by applying the particular operation to at least part of the second user identification information corresponding to the user ID of the 2-nd application, the user ID of the 2-nd application being retrieved from the blockchain database, has been stored, the authentication server determines or supports another device to determine that the account login requesting information is valid at a step of S314 (not illustrated), the authentication server retrieves or supports another device to retrieve the second public key from the blockchain database at a step of S316 (not illustrated), and if the acquired second public key corresponds to the specific public key, the authentication server determines or supports another device to determine the specific public key as valid at a step of S318 (not illustrated).

That is, the user authentication method of the second example embodiment may perform the authentication in response to a request for the account login of the 2-nd application by referring to the second authentication information transaction stored in the blockchain database.

Third Example Embodiment

Next, the third example embodiment of the method in accordance with the present disclosure is explained. Below, the technological characteristics identical to those of the aforementioned first and second example embodiments will be omitted, and only specific details will be disclosed.

By referring to FIG. 3 again, in the third example embodiment, the simple account registration method aforementioned in the first and second example embodiments may be performed on condition that a first representative hash value or its processed value has been stored in the blockchain database, wherein the first representative hash value is calculated by using both (i) a first specific hash value which is a hash value of the authentication information transaction and (ii) its corresponding at least one neighboring hash value which is one of hash values including a hash value of an associated authentication information transaction.

Thereafter, in the third example embodiment, the aforementioned steps of S225 to S235 may include a step as follows: the authentication server refers to the blockchain database when determining the validity of the account registration requesting information. Specifically, each validity of the public keys and the hash values of the user identification information may be determined by using the authentication information transaction acquired from the blockchain database.

The third example embodiment in accordance with the present disclosure shows a configuration of anchoring that seeks two-fold integrity of recorded information, by recording individual transactions about the UTXO in the first blockchain database and then recording a representative hash value, created from the transactions recorded in the first blockchain database, in the second blockchain database. In this case, the simple account registration method of the third example embodiment may be performed on condition that the authentication information transaction has been further stored in the first blockchain database.

To describe the anchoring more specifically, the simple account registration method in accordance with the third example embodiment of the present disclosure may further include processes (not illustrated) as follows: a step S280, where the authentication information transaction is stored in the blockchain database, may include steps performing processes of (A) the authentication server storing or supporting another device to store the authentication information transaction in the first blockchain database, and (B) if one of anchoring conditions is satisfied, the authentication server storing or supporting another device to store a representative hash value or its processed value in the second blockchain database and acquiring a transaction ID representing location information of the representative hash value or its processed value in the second blockchain database. Herein, the representative hash value may be calculated by using both (i) a specific hash value which is a hash value of the authentication information transaction and (ii) its corresponding at least one neighboring hash value which is one of hash values including a hash value of the associated authentication information transaction.

Herein, said one of the anchoring conditions may be one of (i) a condition that a certain number of the specific hash value and the neighboring hash value are acquired or generated, (ii) a condition that a certain amount of time is elapsed, (iii) a condition that a block is created in the first blockchain database, and (iv) a condition that has at least one of characteristics of the services.

The calculation by using both the specific hash value and at least one of the neighboring hash values may be performed by various functions. Supposing that the specific hash value is an input, and that the neighboring hash values are x1, x2, . . . , xn, then a representative hash value t may be expressed as a following formula.

$$t=\text{hash}(\text{function}(\text{input},x1,x2, \ldots ,xn)) \qquad <\text{Equation 1}>$$

Herein, the authentication server may record and manage the specific hash value and its corresponding at least one neighboring hash value in a certain data structure. Herein, the data structure may vary and one example may be a Merkle tree. In this case, the calculation using both (i) the specific hash value and (ii) at least one hash value of at least one neighboring node which corresponds to a node of the specific hash value may be performed by using the Merkle tree.

That is, the authentication server may perform (i) a process of creating at least one Merkle tree by allotting the specific hash value to its leaf node, and (ii) a process of registering, if said one of the anchoring conditions is satisfied, the representative hash value or its processed value calculated by using (ii-1) the specific hash value of a specific leaf node and (ii-2) at least one hash value allocated to at least one of other leaf nodes corresponding to the specific leaf node, with the second blockchain database.

The authentication server may record or support another device to record the hash value allocated to the root node as the representative hash value in the second blockchain database. Herein, a processed value of the representative hash value may be recorded. For example, a resultant value from hex operation on the representative hash value may be recorded.

Meanwhile, a first data structure and a second data structure may be connected in a form of a chain if the authentication server stores the specific hash value and its at least one neighboring hash value in the first data structure and then stores and manages the second data structure identical in a form to the first data structure.

Especially, as the example aforementioned, if the first data structure and the second data structure are Merkle trees, a root value of the first data structure or a hash value of the root value may be allocated to a first leaf node of the second data structure.

Moreover, data integrity may be further ensured by verifying the first data structure when the second data structure is created.

Further, if the Merkle tree is a first tree among two or more Merkle trees linked in chains, a hash value or its processed value of a message data, which includes text, numbers or symbols, may be allocated to a first leaf node of the Merkle tree. For example, at the time of creation of the Merkle tree, a hash value of an input message initially given by the authentication server may be allocated.

Figure 4:
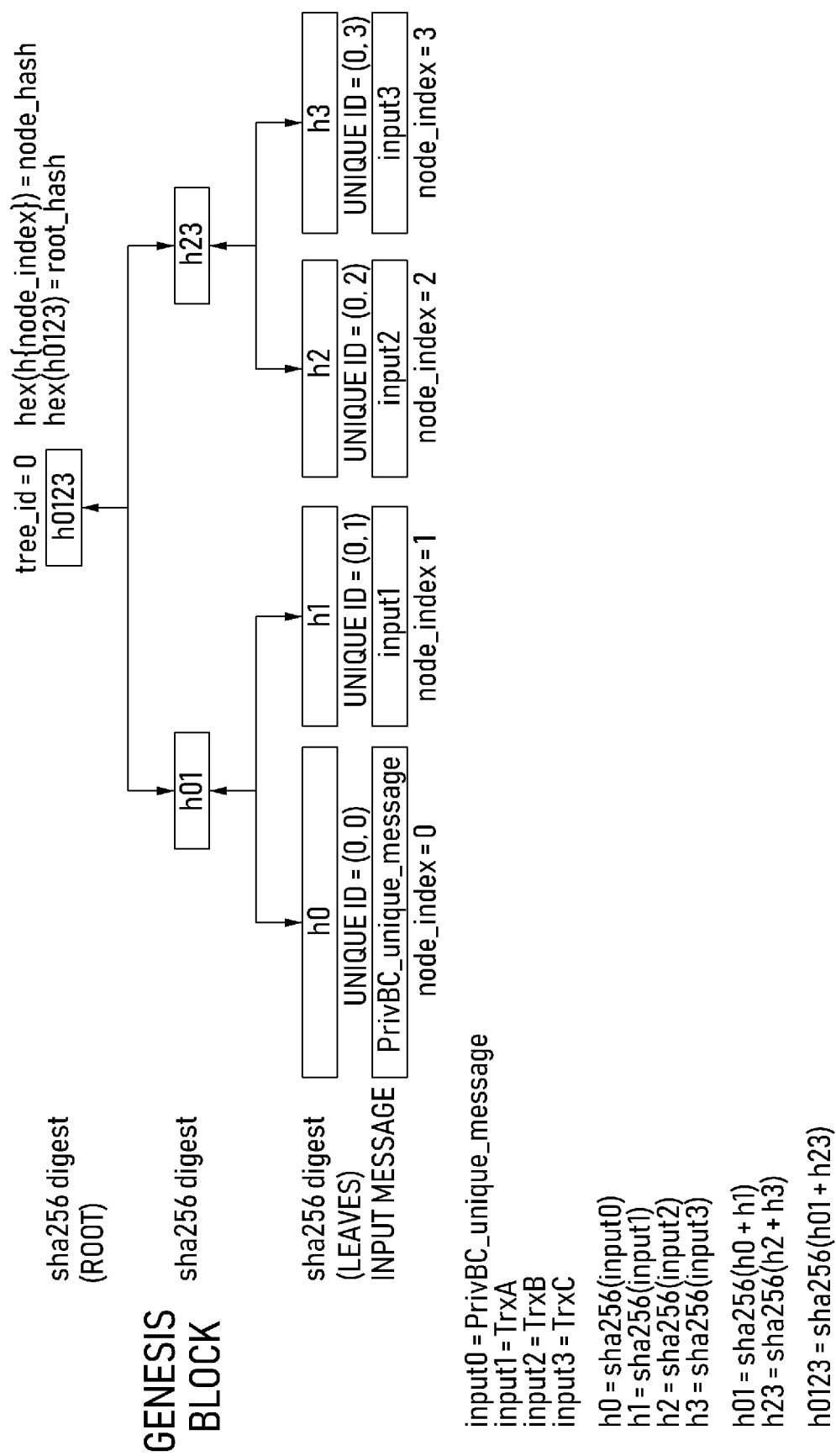
FIGS. 4 and 5 are conceptual drawings schematically illustrating a process of recording an authentication information transaction in a blockchain database in accordance with the third example embodiment of the present disclosure.
Figure 5:
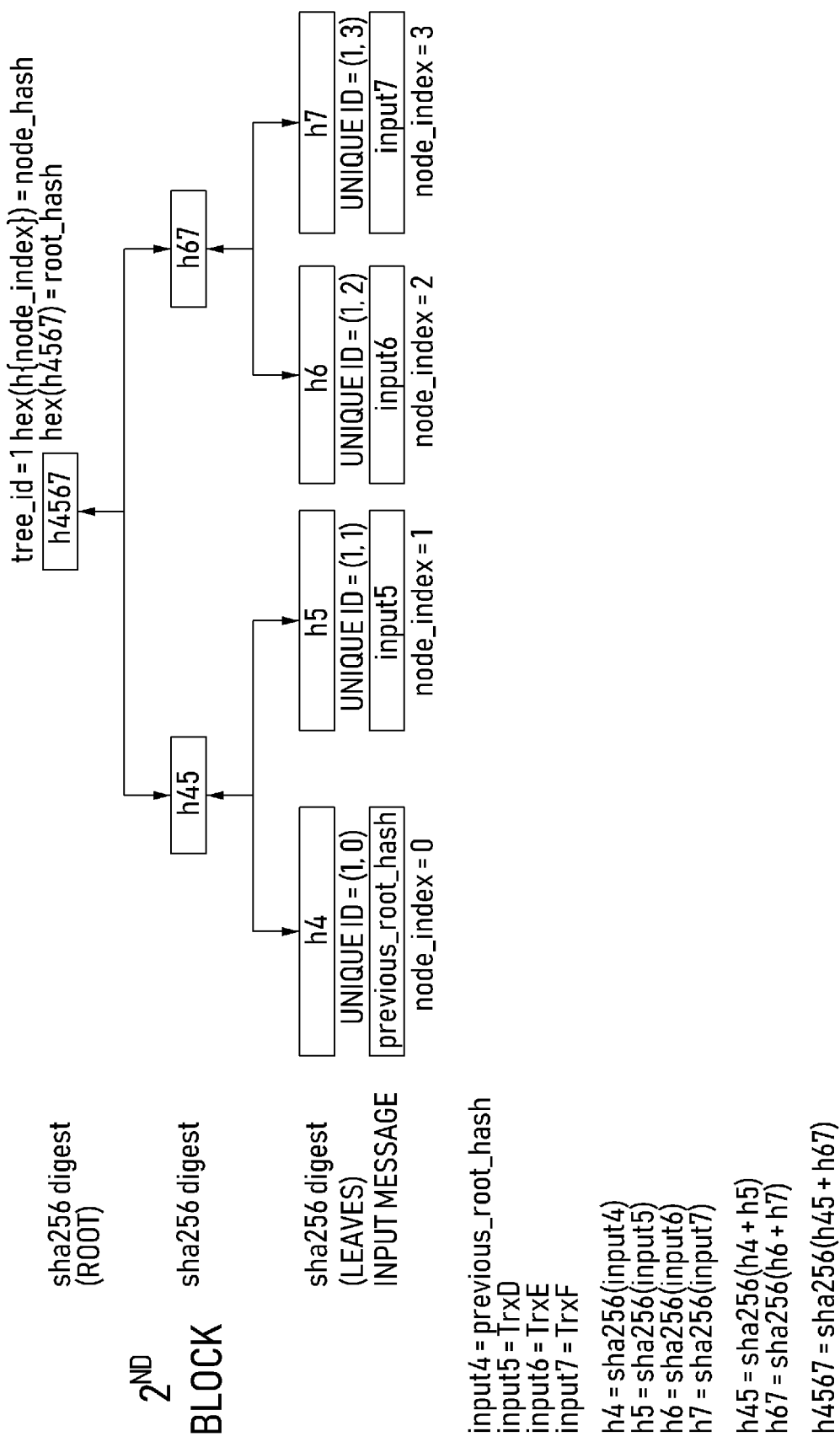

FIGS. 4 and 5 are drawings illustrating an example of a Merkle tree created in accordance with the present disclosure.

FIG. 4 illustrates a Merkle tree with four ($2^2$) leaf nodes. As the illustrated Merkle tree is a first Merkle tree whose tree_id is zero, a hash value SHA256 (PrivBC_unique_message) of PrivBC_unique_message is allocated to an h0 node which is a first leaf node. If transactions are being recorded, the authentication server may create a leaf node next to a last leaf node of the Merkle tree currently being generated, and may allocate or support another device to allocate the specific hash value or its processed value to said next leaf node. For example, if an allocation of values is completed with the h1 node as a last which is a second leaf node of the Merkle tree in FIG. 4, and if a new leaf node is to be created, then an h2 node which is a next leaf node may be created and the specific hash value or its processed value (sha256 (input2)) may be allocated to the h2 node. Further, the authentication server may calculate or support another device to calculate by using (i) a specific hash value and (ii) a hash value allocated to an h3 node which is a sibling node of the h2 node which is a third leaf node to which the specific hash value is allocated. The hash value of the calculated value above may be allocated to an h23 node which is a parent node of the h2 node and the h3 node. As the parent node, i.e., the h23 node, is not the root node of the Merkle tree, the authentication server may repeat the process by regarding the hash value allocated to the h23 node as the specific hash value. In other words, with the hash value allocated to the h23 node as a specific hash value, the hash values allocated to the h23 node and an h01 node may be used together to be calculated and allocated to an h0123 node which is a parent node of the h23 node and the h01 node. Herein, since the h0123 node is the root node, the authentication server may record or support another device to record the processed value hex(h{node_index}) of the hash value allocated to the h0123 node in the second blockchain database.

To explain this in a recursive way, if said one of the anchoring condition is satisfied, the authentication server may (x1) calculate or support another device to calculate an intermediate value by using both (i) the specific hash value and (ii) a hash value allocated to a sibling node of the specific leaf node, and then allocate or support another device to allocate a hash value of the intermediate value to a parent node of the specific leaf node, (x2) record or support another device to record the hash value of the intermediate value in the second blockchain database as the representative hash value if the parent node is a root node of the Merkle tree, and (x3) repeat steps from (x1) to (x3) by regarding the hash value of the intermediate value as the specific hash value and regarding the parent node as the specific leaf node if the parent node is not the root node.

In the third example embodiment, if the hash values including a hash value of the specific authentication information transaction are acquired as many as the number of the leaf nodes, then each of the hash values may be each input value, i.e., each value allocated to each of the leaf nodes, to the aforementioned Merkle tree.

Also, the authentication server may create a root value of the Merkle tree aforementioned at stated intervals, by referring to the anchoring condition (ii) above. In this case, if a certain amount of time is elapsed, the authentication server may create the Merkle tree by referring to input values by the time, and may record or support another device to record the root value of the Merkle tree in the second blockchain database.

However, in this case, no value may be allocated to a sibling node of the node to which the specific hash value is allocated even though the certain amount of time is elapsed. In case no hash value is allocated to the sibling node even though one of the anchoring conditions is satisfied, the authentication server may allocate or support another device to allocate a certain hash value to the sibling node to thereby produce a root value of the Merkle tree by the method aforementioned. For example, the authentication server may copy the specific hash value and allocate or support another device to allocate the specific hash value to the sibling node.

The characteristics of services may be at least part of information on cost paid by entities who use the method in accordance with the present disclosure, information on a time-zone during which recording of the transaction is performed, information on a location where the recording of the transaction is performed and information on a type of a company which is a managing entity of a server involved in the recording. However, the scope of the present disclosure is not limited thereto.

Meanwhile, if a creation of a new Merkle tree starts and if one of the anchoring conditions is satisfied with no transaction having been received, the authentication server may create or support another device to create the new Merkle tree by allotting certain message data to its first and second leaf nodes and may record or support another device to record the root value of the new Merkle tree or its processed value in the second blockchain database. In this case, the new Merkle tree with two leaf nodes may be created.

Meanwhile, a first data structure and a second data structure may be connected in a form of a chain if the authentication server, as aforementioned, stores the specific hash value and its at least one neighboring hash value in the first data structure and then stores and manages the second data structure identical in a form to the first data structure. Especially, if the first data structure and the second data structure are Merkle trees, a root value of the first data structure or a hash value of the root value may be allocated to a first leaf node of the second data structure.

FIG. 5 is a drawing illustrating an example of a Merkle tree created in a form of the second data structure in accordance with the present disclosure.

By referring to FIG. 5, it is clear that the root value hex(h0123) of the Merkle tree whose tree_id is zero in FIG. 4 is allocated to the first leaf node which is an h4 node of a new Merkle tree. In such a manner, the present disclosure has advantage of improving data integrity, as tracking becomes easier even in a case of data forgery, by connecting multiple data structures created when a transaction occurs.

Also, a method for registering a certificate in accordance with the third example embodiment of the present disclosure may further include steps (not illustrated) as follows: periodically or in response to the integrity verification request, the authentication server verifies whether a first representative hash value or its processed value is identical to its corresponding second representative hash value or its processed value stored in the second blockchain database, to thereby verify or support another device to verify an integrity of at least one transaction stored in the first blockchain database. Herein, the first representative hash value is calculated by using both (i) a hash value of the at least one transaction which is one of transactions including the specific authentication information transaction and (ii) its corresponding at least one neighboring hash value.

As one example, the first blockchain database may be a private blockchain database and the second blockchain database may be a public blockchain database.

However, the scope of the present disclosure is not limited thereto, and those skilled in the art will understand that the first blockchain database may be the private blockchain database or the public blockchain database, and that in the same manner, the second blockchain database may be any one of the private blockchain database and the public blockchain database.

Next, the user authentication method in accordance with the third example embodiment is explained, but the technological characteristics identical to those of the aforementioned first and second example embodiments will be omitted, and only specific details will be disclosed.

In the user authentication method of the third example embodiment of the present disclosure, the steps S310 to S320 aforementioned in the first and second example embodiments may be performed on condition that a representative hash value or its processed value has been stored in the blockchain database, wherein the representative hash value is calculated by using both (i) a specific hash value which is a hash value of the authentication information transaction and (ii) its corresponding at least one neighboring hash value which is at least one of hash values including the hash value of the associated authentication information transaction. Meanwhile, whether the account login requesting information and the specific public key are valid may be determined by the authentication server by referring to the blockchain database.

That is, the third example embodiment improves an integrity of authentication-related information by using anchoring, that is, using the first blockchain database in addition to the second blockchain database which is the blockchain database aforementioned in the second example embodiment.

Throughout all of the example embodiments described in the specification so far, an account registration service is provided, which is capable of replacing a conventional repetitive account registration service in a secure and simpler way.

Advantage of a technique described herein with the example embodiments is guaranteeing reliability and security of the registration and the authentication of a user account by preventing forgery and falsification of the authentication-related information and improving usability.

The present disclosure has an effect of registering the account in a secure and simpler way.

The present disclosure has another effect of providing high security by high level encryption, authentication, and verification.

Based on the explanation of the above embodiments, those skilled in the art can clearly understand that the present disclosure may be implemented by combination of software and hardware or hardware alone. The part contributing to the prior art or the object of a technical solution of the present disclosure may be implemented in a form of executable program command through a variety of computer components and may be recorded in computer readable media. The computer readable media may include solely or in combination, program commands, data files, and data structures. The program commands recorded to the media may be components specially designed for the present invention or may be known and usable to a skilled human in a general field. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for streamlining the process of registering a new account for a user based on public key infrastructure (PKI) and an existing account for the user for a different application, the method comprising:
   (a) receiving, by an authentication server, a request to register an initial account for the user from a 1-st application executing on a user device, wherein the request to register the initial account includes (i) a personal information for authentication of a user, (ii) a first user ID corresponding to the 1-st application;
   (b) determining, by the authentication server, a validity of the personal information for authentication of the user;
   (c) if the personal information for authentication are determined as valid, receiving, by the authentication server, (i) a first public key of a first key pair created by the 1-st application within a secure element included in the user device and (ii) a first push ID that is created to be corresponding to the 1-st application;
   (d) storing, by the authentication server, a first user identification information in the authentication server to be used for identifying the user of the 1-st application, to thereby register the initial account, wherein the first user identification information includes (i) the personal information for authentication of the user that is acquired by the authentication server from the 1-st application, (ii) the first user ID corresponding to the 1-st application, (iii) the first public key and (iv) the first push ID;
   (e) receiving, by the authentication server, a request to register a simple account for the user from a 2-nd application executing on the user device that is different than the 1-st application, wherein the request to register a simple account for the user includes (i) the personal information for authentication of the user and (ii) a second user ID corresponding to the 2-nd application;
   (f) encoding, by the authentication server, variable authentication information using the first public key of the first user identification information stored in the authentication server corresponding to the personal information for authentication of the user that is acquired by the authentication server from the 2-nd application, to thereby create encrypted variable authentication information;
   (g) transmitting, by the authentication server, the encrypted variable authentication information to the 1-st application using the first push ID of the first user identification information stored in the authentication server corresponding to the personal information for authentication of the user that is acquired by the authentication server from the 2-nd application, to thereby allow the 1-st application to display to the user the variable authentication information, created by decoding the encrypted variable authentication information with a first private key corresponding to the first public key;
   (h1) receiving from the 2-nd application, by the authentication server, (i) the variable authentication information created by decoding the encrypted variable authentication information, (ii) a second public key of a second key pair created by the 2-nd application based on the PKI within the secure element included in the user device, and (iii) a second push ID that is created to be corresponding to the 2-nd application, wherein the variable authentication information is inputted to the 2-nd application by the user device; and
   (h2) if the variable authentication information received from the 2-nd application matches the variable authentication information that was encoded by the authentication server, storing, by the authentication server, a second user identification information to be used for identifying the user of the 2-nd application, wherein the second identification information includes (i) the personal information for authentication of the user that is acquired by the authentication server from the 2-nd application, (ii) the second user ID corresponding to the 2-nd application, (iii) the second public key that was created by the 2-nd application and transmitted to the authentication server, and (iv) the second push ID that was created to be corresponding to the 2-nd application and was transmitted to the authentication server by the 2-nd application.

2. The method of claim 1, wherein, at the step of (h1), if a specific PIN number is further acquired from the 2-nd application in addition to the variable authentication information, the second public key, and the second push ID, then the authentication server determines a validity of the variable authentication information and the specific PIN number, and
   wherein, at the step of (h2), if the variable authentication information and the specific PIN number are determined as valid, the authentication server stores the second user identification information.

3. The method of claim 2, wherein, at the step of (h1), if the specific PIN number is identical to a designated PIN number which is set beforehand by the user as corresponding to the 1-st application, then the specific PIN number is determined as valid.

4. The method of claim 1, wherein the personal information for authentication of the user is a phone number corresponding to the user device.

5. The method of claim 1, wherein the variable authentication information is a random nonce or information on an image file.

6. The method of claim 1, wherein the step of (d) includes steps of:
   (d1) the authentication server retrieving the user ID corresponding to the 1-st application by referring to the acquired account registration requesting information and the acquired personal information for authentication;
   (d2) the authentication server, if the user ID corresponding to the 1-st application is retrieved, and if a function value of the first user identification information is determined as stored by referring to information representing whether the function value of the first user identification information created by applying a particular operation to at least part of the first user identification information corresponding to the user ID of the 1-st application, the user ID of the 1-st application being retrieved from a blockchain database, has been stored, determining that the account registration requesting information and the personal information for authentication are valid; and (d3) the authentication server retrieving the first public key from the blockchain database.

7. The method of claim 1, wherein, at the step of (h1), the authentication server further stores an authentication information transaction including one of (i) the second public key and a function value of second user identification information created by applying a particular operation to at least part of the second user identification information and (ii) a processed value of said (i), in a blockchain database.

8. The method of claim 6, wherein, at the step of (h1), the authentication server further stores an authentication information transaction including one of (i) the second public key and a function value of second user identification information created by applying a particular operation to at least part of the second user identification information and (ii) a processed value of said (i), in a blockchain database and wherein the blockchain database is a private blockchain database or a public blockchain database.

9. The method of claim 1, wherein, at the step of (h2), if the variable authentication information is determined as valid, the authentication server transmits an account registration message, representing that the simple account registration is completed, to the 2-nd application.

10. A method for streamlining the process of authenticating a user based on public key infrastructure (PKI) and an existing account for the user for a different application, the method comprising:

(a) receiving by an authentication server, after a request to register an initial account of the user from a 1-st application executing on a user device, a request to authenticate the user;

(b) determining by the authentication server, in response to the request to authenticate the user, that (1) first user identification information including (i) personal information for authentication of the user, (ii) a user ID, corresponding to a 1-st application, of the user, (iii) a first public key created by a secure element included in a user device of the user, and (iv) a first push ID created to be corresponding to the 1-st application has been stored in the authentication server in response to the request to register the initial account of the user, wherein the first user identification information is to be used for identifying the user of the 1-st application corresponding to the initial account, (2) (i) the personal information for authentication and (ii) account registration requesting information which is information for requesting a simple account registration based on PKI have been acquired from the user device via a 2-nd application, different from the 1-st application, executed on the user device, (3) if the personal information for authentication and the account registration requesting information have been determined as valid by a managing party of an application service or by a managing party of the authentication server, encrypted first variable authentication information that is created by the authentication server by encoding first variable authentication information with the first public key has been transmitted to the 1-st application by the authentication server, to thereby allow the 1-st application to display the first variable authentication information, created by decoding the encrypted first variable authentication information with a first private key corresponding to the first public key, to the user, (4) the authentication server has received from the 2-nd application (i) a second public key of a second key pair created by the 2-nd application based on the PKI within the secure element included in the user device, (ii) a second push ID that is created to be corresponding to the 2-nd application, and (iii) the first variable authentication information created by decoding the encrypted variable authentication information, and (5) if the first variable authentication information received from the 2-nd application matches the variable authentication information that was encoded by the authentication server, second user identification information including (i) the personal information for authentication of the user, (ii) the user ID corresponding to the 2-nd application, (iii) the second public key, and (iv) a second push ID that is created to be corresponding to the 2-nd application has been stored in the authentication server, wherein the second user identification information is to be used for identifying the user of the 2-nd application, and that, as a result, the simple account registration has been completed;

(c) if a specific public key and account login requesting information, which is information for requesting an account login based on the PKI via the 2-nd application, are acquired, determining, by the authentication server, whether the account login requesting information and the specific public key are valid; and (d) if the account login requesting information and the specific public key are determined as valid, performing, by the authentication server, the account login based on the second user identification information.

11. The method of claim 10, wherein the step of (d) includes steps of:

(d1) the authentication server transmitting second variable authentication information to the 2-nd application, to thereby allow the user device to generate signed second variable authentication information by signing the second variable authentication information using the secure element and to transmit the signed second variable authentication information to the authentication server;

(d2) the authentication server verifying a validity of the signed second variable authentication information by using the stored second public key; and (d3) the authentication server, if the signed second variable authentication information is determined as valid, allowing the account login.

12. The method of claim 10, wherein, at the step of (c), if a specific PIN number inputted into the user device is further acquired in addition to the account login requesting information and the specific public key, then the authentication server determines a validity of the account login requesting information, the specific public key, and the specific PIN number, and wherein, at the step of (b), if the account login requesting information, the specific public key, and the specific PIN number are determined as valid, the authentication server performs the account login based on the second user identification information.

13. The method of claim 10, wherein, at the step of (c), if the second public key corresponds to the specific public key, then the specific public key is determined as valid.

14. The method of claim 10, wherein the step of (c) includes steps of:
 (c1) the authentication server retrieving the user ID of the 2-nd application by referring to information including the acquired account login requesting information;
 (c2) the authentication server, if the user ID of the 2-nd application is retrieved, and if a function value of the second user identification information is determined as stored by referring to information representing whether the function value of the second user identification information created by applying a particular operation to at least part of the second user identification information corresponding to the user ID of the 2-nd application, the user ID of the 2-nd application being retrieved from a blockchain database, has been stored, determining that the account login requesting information is valid;
 (c3) the authentication server retrieving the second public key from the blockchain database; and
 (c4) the authentication server, if the acquired second public key corresponds to the specific public key, determining that the specific public key is valid.

15. An authentication server for streamlining the process of registering a new account for a user based on public key infrastructure (PKI) and an existing account for the user for a different application, the authentication server comprising:
 a communication part to receive a request to register an initial account for the user;
 a memory to store instructions; and
 a processor, operably coupled to the memory and the communication part, to execute the instructions, the instructions causing the processor to:
  write to a storage, in response to the request, first user identification information for the user including (i) personal information for authentication of the user, (ii) a user ID, corresponding to a 1-st application, of the user, (iii) a first public key created by a secure element included in a user device of the user, and (iv) a first push ID created to be corresponding to the 1-st application, wherein the first user identification information is to be used for identifying the user of the 1-st application corresponding to the initial account, for acquiring the personal information for authentication and account registration requesting information, which is information for requesting a simple account registration based on PKI, from the user device via a 2-nd application, different from the 1-st application, executed on the user device; and
  perform processes of (I) determining a validity of the personal information for authentication and the account registration requesting information if the personal information for authentication and the account registration requesting information are acquired, and (II) if the account registration requesting information and the personal information for authentication are determined as valid by a managing party of an application service or by a managing party of the authentication server, performing the simple account registration based on the account registration requesting information,
  wherein the process of (II) includes processes of:
   (II-1) if a specific public key and account login requesting information, which is information for requesting an account login based on the PKI via the 2-nd application, are acquired, determining whether the account login requesting information and the specific public key are valid; and
   (II-2) after receiving from the 2-nd application (i) the first variable authentication information obtained by decoding encrypted second variable authentication information transmitted to the user device, (ii) a second public key of a second key pair created by the 2-nd application based on the PKI within a secure element included in the user device, and (iii) a second push ID that is created to be corresponding to the 2-nd application, determining a validity of the variable authentication information; and
   (II-3) if the first variable authentication information received from the 2-nd application matches the second variable authentication information that is encrypted and transmitted to the user device, writing to the storage second user identification information to be used for identifying the user of the 2-nd application, wherein the second identification information includes (i) the personal information for authentication of the user that is acquired by the authentication server from the 2-nd application, (ii) the second user ID corresponding to the 2-nd application, (iii) the second public key that was created by the 2-nd application and transmitted to the authentication server, and (iv) the second push ID that was created to be corresponding to the 2-nd application and was transmitted to the authentication server by the 2-nd application.

16. The authentication server of claim 15, wherein, at the process of (II-2), if a specific PIN number is further acquired from the 2-nd application in addition to the variable authentication information, the second public key, and the second push ID, then the processor determines a validity of the variable authentication information and the specific PIN number, and
 wherein, at the process of (II-3), if the variable authentication information and the specific PIN number are determined as valid, the processor writes to the storage the second user identification information.

17. The authentication server of claim 16, wherein, at the process of (II-2), if the specific PIN number is identical to a designated PIN number which is set beforehand by the user as corresponding to the 1-st application, then the specific PIN number is determined as valid.

18. The authentication server of claim 15, wherein the process of (I) includes processes of:
 (I-1) retrieving the user ID corresponding to the 1-st application by referring to the acquired account registration requesting information and the acquired personal information for authentication;
 (I-2) if the user ID corresponding to the 1-st application is retrieved, and if a function value of the first user identification information is determined as stored by referring to information representing whether the function value of the first user identification information created by applying a particular operation to at least part of the first user identification information corresponding to the user ID of the 1-st application, the user ID of the 1-st application being retrieved from a blockchain database, has been stored, determining that the account registration requesting information and the personal information for authentication are valid; and (I-3) retrieving the first public key from the blockchain database.

19. The authentication server of claim 15, wherein, at the process of (II-2), the processor further writes to the storage an authentication information transaction including one of (i) the second public key and a function value of the second user identification information created by applying a particular operation to at least part of the second user identification information and (ii) a processed value of said (i), in a blockchain database.

20. The authentication server of claim 15, wherein, at the process of (II-3), if the variable authentication information is determined as valid, the processor transmits an account registration message, representing that the simple account registration is completed, to the 2-nd application.

21. An authentication server for streamlining the process of authenticating a user based on public key infrastructure (PKI) and an existing account for the user for a different application, the authentication server comprising:
a communication part to receive a request to authenticate the user;
a memory to store instructions; and
a processor, operably coupled to the memory and the communication part, to execute the instructions, the instructions causing the processor to:
determine, in response to the request, that (1) first user identification information for the user including (i) personal information for authentication of a user, (ii) a user ID, corresponding to a 1-st application, of the user, (iii) a first public key created by a secure element included in a user device of the user, and (iv) a first push ID created to be corresponding to the 1-st application has been stored in the authentication server in response to a request for registration of an initial account of the user, wherein the first user identification information is to be used for identifying the user of the 1-st application corresponding to the initial account, (2) (i) the personal information for authentication and (ii) account registration requesting information which is information for requesting a simple account registration based on PKI have been acquired from the user device via a 2-nd application, different from the 1-st application, executed on the user device, (3) if the personal information for authentication and the account registration requesting information have been determined as valid by a managing party of an application service or by a managing party of the authentication server, encrypted first variable authentication information created by encoding first variable authentication information with the first public key has been transmitted to the 1-st application by the authentication server, to thereby allow the 1-st application to display the first variable authentication information, created by decoding the encrypted first variable authentication information with a first private key corresponding to the first public key, to the user, (4) (i) a key pair of a second public key and a second private key based on the PKI has been created, in the secure element included in the user device, by the 2-nd application, (ii) a second push ID created be corresponding to the 2-nd application, the decoded encrypted first variable authentication information, and the second public key have been acquired from the 2-nd application by the authentication server, and (5) if the decoded encrypted first variable authentication information received from the user device matches the first variable authentication information transmitted from the authentication server to the user device, second user identification information including (i) the personal information for authentication of the user, (ii) the user ID corresponding to the 2-nd application, (iii) the second public key, and (iv) the second push ID created to be corresponding to the second application has been stored in the authentication server, wherein the second user identification information is to be used for identifying the user of the second application, and that, as a result, the simple account registration has been completed, for acquiring a specific public key and account login requesting information, which is information for requesting an account login based on the PKI via the 2-nd application; and
performing processes of (I) determining whether the account login requesting information and the specific public key are valid if the specific public key and the account login requesting information are acquired and (II) if the account login requesting information and the specific public key are determined as valid, performing the account login based on the second user identification information.

22. The authentication server of claim 21, wherein the process of (II) includes processes of:
(II-1) transmitting second variable authentication information to the 2-nd application, to thereby allow the user device to generate signed second variable authentication information by signing the second variable authentication information using the secure element and to transmit the signed second variable authentication information to the authentication server;
(II-2) verifying a validity of the signed second variable authentication information by using the stored second public key; and
(II-3) if the signed second variable authentication information is determined as valid, allowing the account login.

23. The authentication server of claim 21, wherein, at the process of (I), if a specific PIN number inputted into the user device is further acquired in addition to the account login requesting information and the specific public key, then the processor determines a validity of the account login requesting information, the specific public key, and the specific PIN number, and
wherein, at the process of (II), if the account login requesting information, the specific public key, and the specific PIN number are determined as valid, the processor performs the account login based on the second user identification information.

24. The authentication server of claim 21, wherein, at the process of (I), if the second public key corresponds to the specific public key, then the specific public key is determined as valid.

25. The authentication server of claim 21, wherein the process of (I) includes processes of:
(I-1) retrieving the user ID of the 2-nd application by referring to information including the acquired account login requesting information;
(I-2) if the user ID of the 2-nd application is retrieved, and if a function value of the second user identification information is determined as stored by referring to information representing whether the function value of the second user identification information created by applying a particular operation to at least part of the second user identification information corresponding to the user ID of the 2-nd application, the user ID of the 2-nd application being retrieved from a blockchain database, has been stored, determining that the account login requesting information is valid;

(I-3) retrieving the second public key from the blockchain database; and (I-4) if the acquired second public key corresponds to the specific public key, determining that the specific public key is valid.

\* \* \* \* \*